W. H. STONE.
PLOW.
APPLICATION FILED APR. 8, 1911.
1,023,771.
Patented Apr. 16, 1912.
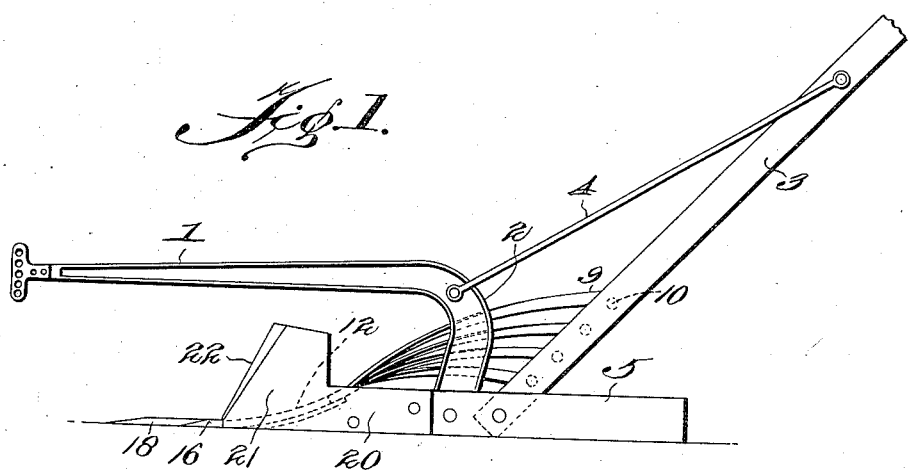
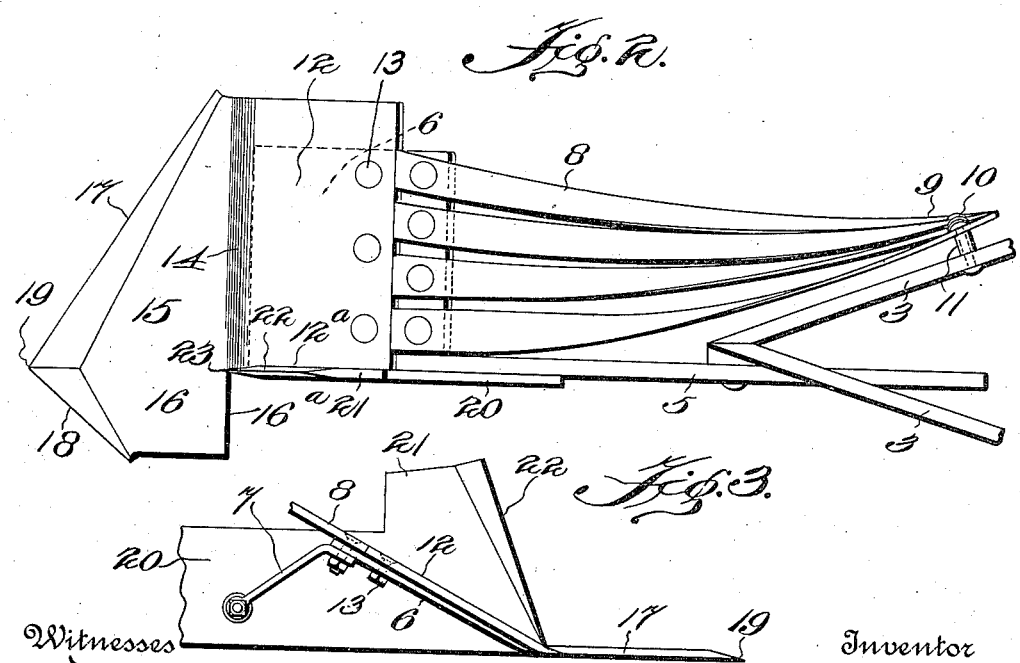

UNITED STATES PATENT OFFICE.

WILLMAN H. STONE, OF BAYARD, NEBRASKA.

PLOW.

1,023,771.  Specification of Letters Patent.  Patented Apr. 16, 1912.

Application filed April 8, 1911. Serial No. 619,856.

*To all whom it may concern:*

Be it known that I, WILLMAN H. STONE, a citizen of the United States, residing at Bayard, in the county of Morrill and State of Nebraska, have invented certain new and useful Improvements in Plows; and I do hereby declare the following to be a full, clear, and exact description of the invention, such as will enable others skilled in the art to which it appertains to make and use the same.

This invention relates to improvements in plows, and is designed to provide a plow which is simple in construction, durable and effective in operation in the development of lands under certain agricultural conditions.

In the preparation of land such as raw prairie sod, or black root, which exists in the western prairie, also alfalfa ground there has always been a great drawback, owing to the fact that alfalfa ground is the hardest to be plowed of any known land in the west, the roots penetrating to a great depth and being of several inches diameter.

The object of the present invention is to overcome these obstacles by providing a plow of a novel type which will operate effectively under these conditions, and which may be of such a light type as to do the work with a much lower percentage of power than has heretofore been required in heavier type plows.

While the invention is not restricted to the exact details shown and described, still for the purpose of disclosure reference is had to the accompanying drawings illustrating a practical and preferred embodiment of the same, in which drawings like characters designate the same parts in the several views, and in which—

Figure 1 is a view in side elevation of the improved plow. Fig. 2 is a plan view of the same, with the plow beam omitted for clearness, and Fig. 3 is a fragmentary elevation of the plow share and mold board looking from the opposite side to that illustrated in Fig. 1.

1 designates the plow beam showing a standard 2 formed integral therewith, connected to the plow handles 3 by the stay rods 4, the lower end of the standard and the plow handles being secured to a land side 5 in the usual way.

A transverse plate 6 extends laterally of the forward end of the land side and forms a support for the plow share and mold board hereinafter described, it being observed that the plate 6 inclines downwardly and forwardly. The outer upper end of this plate is supported by a suitable bent arm or bracket 7, and at the upper edge of the plate are arranged a plurality of flat bars 8 extending upwardly and curving outwardly at their inner ends, as at 9, terminating in a substantially vertical plane and connected to the plow handle 3 at that side by means of the bolts 10 and the spacing sleeves 11, these curved bars or slats forming a mold board for turning over the ground.

It will be observed from Fig. 2 that the lower ends of these slats 8 terminate in the same line, and lying flush therewith and supported by the lateral plate 6 is the upper portion of a particular type of share, comprising the inclining rectangular portion 12 bolted to the plate 6, as at 13, and slightly curved or bent centrally as at 14, thence extending outwardly in a substantially horizontal plane forming the lower section 15 provided with the cutting edge of the share. In this particular type of share this lower horizontal or forward portion 15 projects for a substantial distance, as shown at 16, to the outside of the edge of the upper or rear section 12, and is provided with a triangular cutting edge having a longer edge 17 and a shorter edge 18, the two edges merging as at 19 in a point disposed in substantial alinement with the land side of the plow.

A fixed colter plate is provided forming a continuation of the land side and having a vertical cutting edge in line with the point 19. This colter is substantially L-shaped, having the vertical elongated portion 20 bolted to the land side and the forward upright projection 21 having a downwardly and forwardly inclining cutting edge 22, the lower portion of which seats within a slit 23 formed at the intersection of the edges 12$^a$ and 16$^a$ of the share. By this particular mounting of the lower edge of the colter it will be observed that the annoying feature of catching or gathering of roots, grasses, weeds and other small obstacles will be done away with, while the particular form of plow share will enable the share to travel several inches below the ground and do effective work with a less percentage of power than the ordinarily constructed plow, and this is particularly accomplished by the fact that there is no side draft or downward pressure of sod on the share and mold board, the edges 17 and 18 severing the vertically disposed roots, while the cutting edge 22 of the colter severs the horizontally disposed roots, and at the same time cutting the sod vertically, allowing it to ride up on the mold board and be turned over without any pullback tendency. A further feature in the arrangement of the short cutting edge 18 is that it acts upon the unplowed land to begin the cutting of the next furrow.

From the foregoing it will be understood that this plow is particularly adaptable for use with certain kinds of ground which has been heretofore plowed with great difficulty, and that in overcoming the obstacles heretofore encountered this is accomplished by a construction of great simplicity and lightness but of durable construction and very effective in operation.

The particular features of novelty will now be pointed out in the following claims.

I claim—

1. In a plow the combination of a base support, a plow beam and a handle secured to said support, a share having an inclining rear portion secured to said support and having a horizontally disposed forward portion of greater width than said inclining portion and provided with a long cutting edge extending at an angle from one side edge of said inclining portion and a second cutting edge of shorter length extending from the opposite side edge of said horizontal portion, the two cutting edges lying in the same horizontal plane and terminating in a common point opposite the land side edge of said inclining portion, substantially as described.

2. In a plow the combination of a base support, a plow beam and a handle secured to said support, a share provided with a rear portion secured to said support and having a horizontally disposed flat forward portion of greater width than said rear portion forming a shoulder with the outer edge of said rear portion, and said horizontal forward portion being provided with a long and a short cutting edge lying in the same horizontal plane and converging outwardly and terminating in a common point in line with the outer edge of said rear portion, and a colter disposed alongside the land side edge of said rear portion and provided with a forward cutting edge in line with said common point, substantially as described.

3. In a plow the combination of a base support, a plow beam and a handle secured to said support, a share provided with a rear upwardly inclining portion secured to said base support and having a forward horizontal flat portion of greater width than said rear portion, said horizontal portion being provided with a forward cutting edge and with a slit at its position of joinder with the outer edge of said rear portion, and a colter alongside the land side edge of said rear portion and provided with a forward cutting edge seating in said slit, substantially as described.

4. In a plow the combination with a land side having an upwardly and rearwardly inclining laterally disposed forward plate, a plow beam and a handle attached to said land side, a plow-share provided with a flat rear portion secured to said lateral plate and a horizontal forward portion of greater width than said rear portion forming a projection having a slit adjacent the outer edge of said rear portion and provided at its forward portion with a long and a short cutting edge converging outwardly and terminating in a point disposed in line with said slit, a colter secured to said land side and having a forward cutting edge inserted in said slit, and a mold board comprising a plurality of slats secured at their lower end to said plate and bent upwardly and outwardly, and means for securing the upper ends of said slats to said handle in substantially vertical alinement, substantially as described.

In testimony whereof, I affix my signature, in presence of two witnesses.

WILLMAN H. STONE.

Witnesses:
B. C. HAMPTON,
D. A. HAMPTON.

---

Copies of this patent may be obtained for five cents each, by addressing the "Commissioner of Patents, Washington, D. C."